(12) United States Patent
Blankenship et al.

(10) Patent No.: US 7,248,560 B1
(45) Date of Patent: Jul. 24, 2007

(54) METHOD AND SYSTEM FOR ROUTER REDUNDANCY IN A WIDE AREA NETWORK

(75) Inventors: Dennis N. Blankenship, Holly Springs, NC (US); Michael H. Otto, Apex, NC (US); Peter D. Beal, Apex, NC (US); John M. Glotzer, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 1033 days.

(21) Appl. No.: 10/162,776

(22) Filed: Jun. 4, 2002

(51) Int. Cl.
*G01R 31/08* (2006.01)
(52) U.S. Cl. .................. 370/220; 370/219; 370/328; 370/401
(58) Field of Classification Search ............... None
See application file for complete search history.

(56) References Cited

U.S. PATENT DOCUMENTS

| | | | |
|---|---|---|---|
| 5,473,599 A | 12/1995 | Li et al. ................. 370/16 |
| 5,648,962 A * | 7/1997 | Pirinen ................. 370/336 |
| 5,815,668 A | 9/1998 | Hashimoto ............. 395/200.68 |
| 5,835,696 A | 11/1998 | Hess ..................... 395/182.08 |
| 5,872,823 A * | 2/1999 | Sutton ................... 375/372 |
| 6,195,705 B1 * | 2/2001 | Leung ................... 709/245 |
| 6,487,605 B1 * | 11/2002 | Leung ................... 709/245 |

FOREIGN PATENT DOCUMENTS

| WO | WO 00/51290 | 8/2000 |
|---|---|---|
| WO | WO 01/22686 A1 | 3/2001 |

OTHER PUBLICATIONS

International Search Report in International Application No. PCT/US 03/10500, dated Jun. 25, 2003, 7 pages.

* cited by examiner

*Primary Examiner*—Bob A. Phunkulh
(74) *Attorney, Agent, or Firm*—Baker Botts, L.L.P.

(57) ABSTRACT

A method for selecting an active router in a communication device includes providing multiple routers in the device, coupling the routers to a single physical link, monitoring a status for each of the routers, and selecting one of the routers as an active router by positioning its corresponding relay.

19 Claims, 3 Drawing Sheets

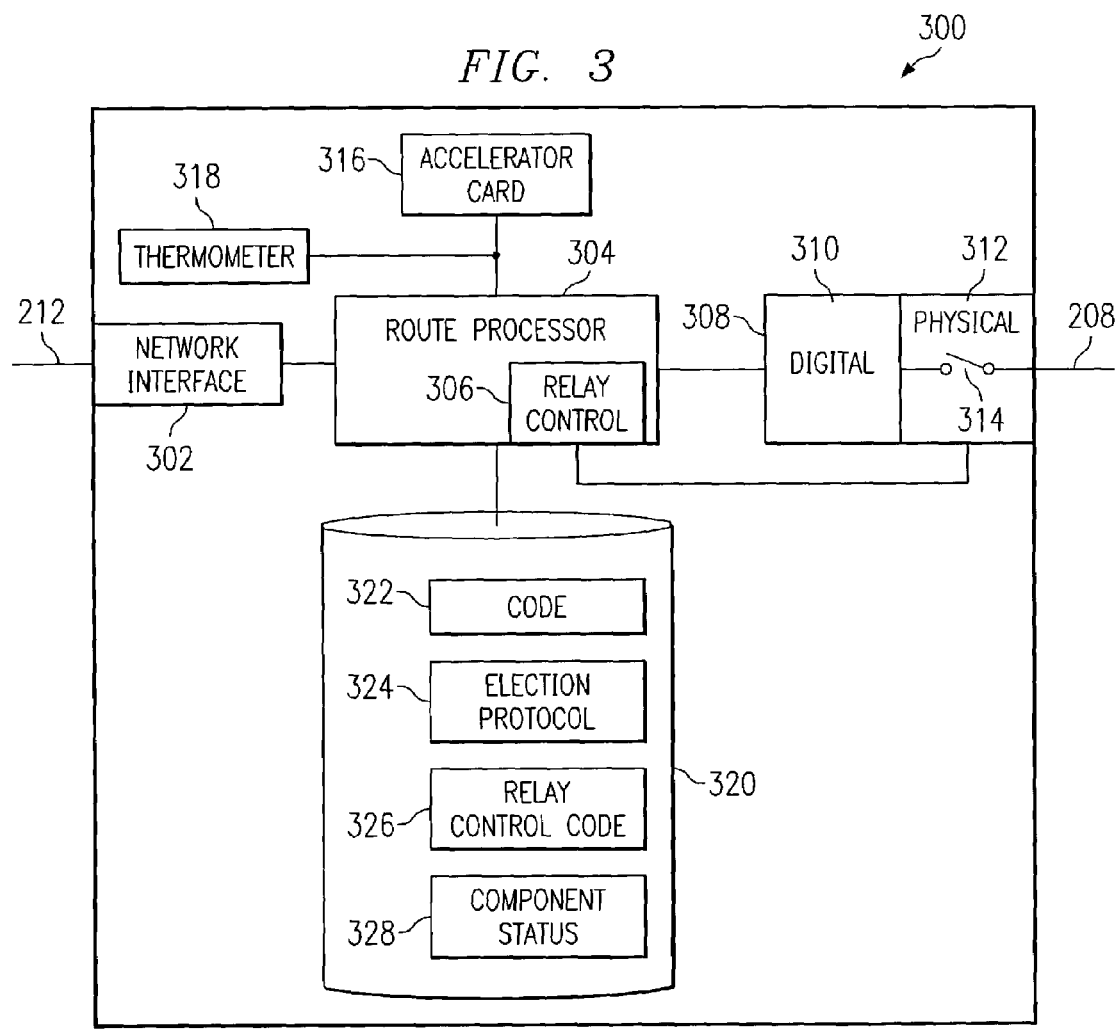

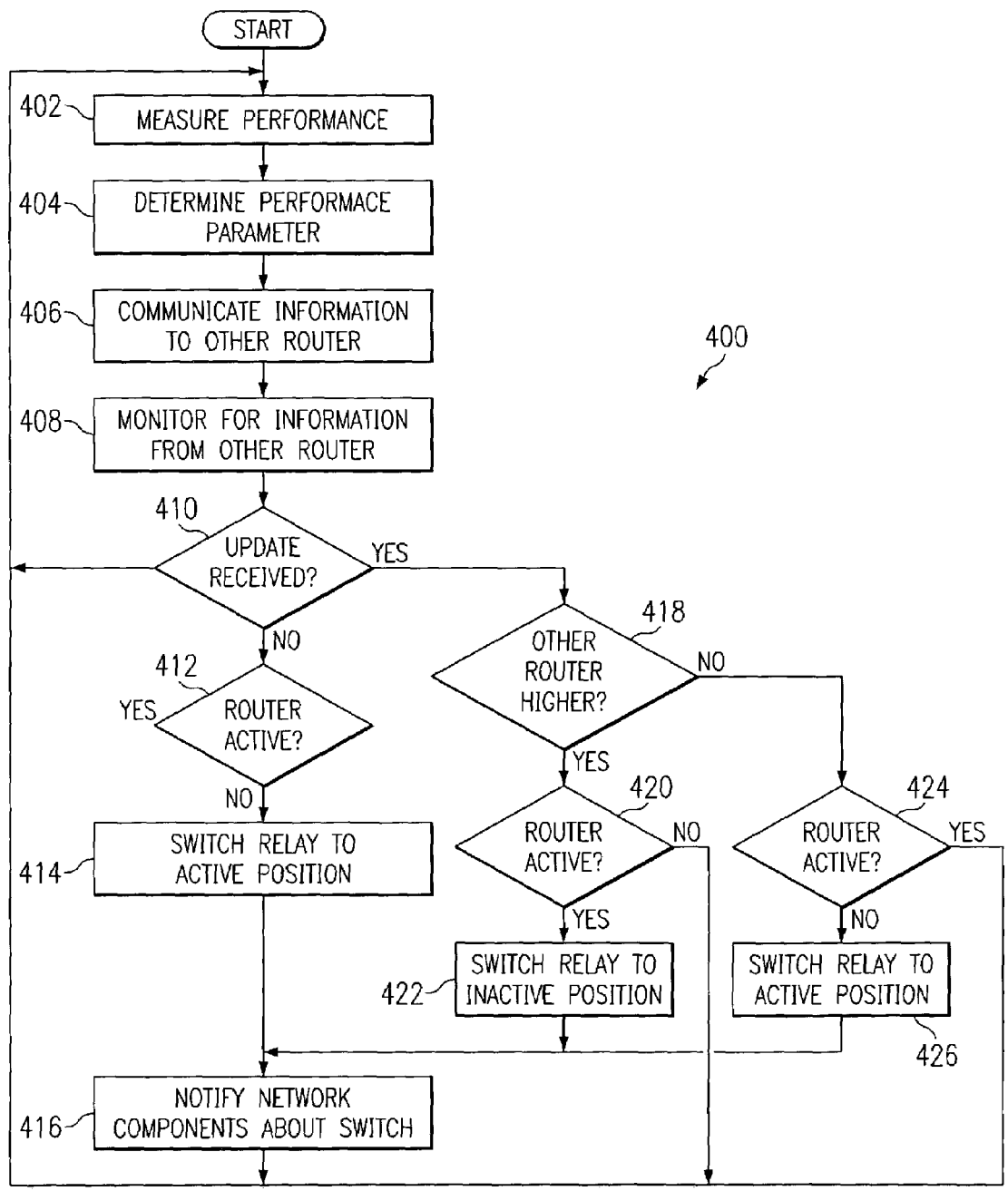

METHOD AND SYSTEM FOR ROUTER REDUNDANCY IN A WIDE AREA NETWORK

TECHNICAL FIELD OF THE INVENTION

This invention relates in general to telecommunication systems, and more particularly to a method and system for router redundancy in a wide area network.

BACKGROUND OF THE INVENTION

Exponential increases in the amount of wireless traffic has placed greater demand on wireless network resources. Often, in order to provide consistent and reliable service, wireless service providers must lease expensive network infrastructure components. For example, base transceiver sites in mobile networks may require expensive connections to base station controllers to allow data from mobile units to reach a network. Sometimes service providers include redundant backhaul links to protect the integrity of the network.

SUMMARY OF THE INVENTION

In accordance with the present invention, the disadvantages and problems associated with providing methods of redundancy in wireless communication networks have been substantially reduced or eliminated. In particular, certain embodiments of the present invention provide a method and system for router redundancy in a wide area network that allows both a primary and a backup router to share a single backhaul link from a base transceiver site.

In a first embodiment, a method for selecting an active router in a communication device includes providing multiple routers in the device, coupling the routers to a single physical link, determining a performance parameter for each of the routers, and selecting one of the routers as an active router by positioning a relay of the router. In a second embodiment, a telecommunications device includes multiple routers, a bus for communicating information between the routers, and a physical link. Each router determines a performance parameter for itself and communicates the performance parameter to the other routers using the bus. The routers each include a relay coupled to the physical link that the router positions based on the performance parameters received from the other routers.

In a third embodiment, a router includes a network interface, a relay and a route processor. The relay is coupled to a physical link. The network interface receives a signal from another router, and the route processor positions the relay based on the signal received from the other router.

In a fourth embodiment, a method for selecting an active router in a communication device includes providing multiple routers coupled to a single physical link. Each router is coupled to the single physical link by a relay that has a connected position and a disconnected position. The method further includes determining a performance parameter for each router, and determining one of the routers as an active router based on the performance parameters. The relay of the active router is positioned in the connected position, while the relays of the other routers are positioned in the disconnected position.

Important technical advantages of certain embodiments of the present invention include redundancy in a network without having to duplicate backhaul links. Using a primary and a backup router, systems according to the present invention may allow redundancy in case of component failure without requiring a second backhaul link. This provides increased versatility in the system, as well as reduced expense for system redundancy.

Other important technical advantages of certain embodiments of the present invention include physical switching to prevent the backhaul link from being terminated on two routers at the same time. The use of relays allows the routers to be switched cleanly, without the concern that electronic or other communication errors may inadvertently broadcast extraneous data over the backhaul link.

Yet another technical advantage of certain embodiments of the present invention is automatic reprovisioning of the network in case of failure. Using a shared election protocol, the primary and backup routers may automatically switch between each other as the active router, and may automatically update other components in the network to reflect the change. Thus, when one of the routers fails, certain embodiments of the present invention allow a seamless transfer between the primary and the backup router without having to reconfigure switches, interface cards, or other hardware that might require rerouting of data.

Particular embodiments of the present invention may include some, all, or none of the enumerated technical advantages. Additional technical advantages will be apparent to one skilled in the art from the following figures, description, and claims.

BRIEF DESCRIPTION OF THE DRAWINGS

For a more complete understanding of the present invention and its advantages, reference is now made to the following description, taken in conjunction with the accompanying drawings, in which:

FIG. 3 shows a router of the base transceiver site of FIG. 2 in accordance with an embodiment of the present invention; and FIG. 4 is a flow chart illustrating a method for monitoring the status of routers and for designating an active router.

DETAILED DESCRIPTION OF THE INVENTION

Figure 1:
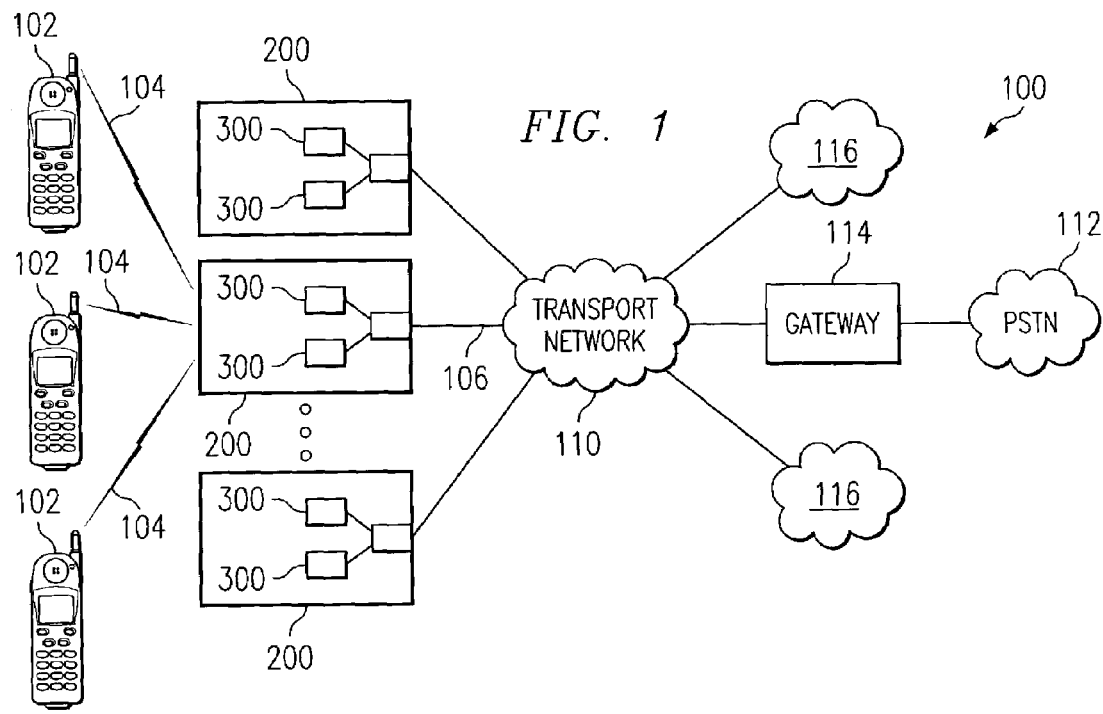
FIG. 1 shows a telecommunication system using a base transceiver site in accordance with an embodiment of the present invention.

FIG. 1 shows a telecommunication system 100 that includes a base transceiver site (BTS) 200 in accordance with a particular embodiment of the present invention. System 100 receives data from wireless communication devices 102 in the form of wireless signals 104. BTS 200 converts the data into packetized signals for communication to a transport network 110 that communicates these packets to other data networks 116 or public switched telephone network (PSTN) 112 through a gateway 114. The fact that particular components have been used in system 100 should not be construed to exclude other suitable components for communicating packetized data.

Wireless communication devices 102 represent any device that receives information in any form from a user, including keypad entry, voice, or any other suitable method of entering information. Wireless communication device 102 converts the information into a wireless signal 104 which is then communicated to a base transceiver site 200. Wireless communication device 102 may use any suitable method for encoding data for transmission, including time division multiplex access (TDMA), frequency division multiplex access (FDMA), code division multiple access (CDMA), or other suitable technique.

Base transceiver site 200 receives wireless signals 104 from wireless communication devices 102 and communicates them to transport network 110. Base transceiver site 200 may include hardware and/or software for receiving wireless signals 104 and converting them into electronic packets. Packets may include any form of encapsulating electronic information, including frames, cells, Internet protocol (IP) packets, or any other segment or portion of data. BTS 200 may also include hardware and/or software for receiving packets from transport network 110 and converting those packets into wireless signals communicated to wireless communications devices 102.

BTS 200 communicates information to transport network 110 using backhaul link 106. Backhaul link 106 represents any method or protocol for communicating information between BTS 200 and transport network 110. For example, backhaul link 106 may be a T1, T3, or other suitable connection that carries information from BTS 200 in the form of Internet protocol (IP) packets. Because backhaul link 106 may carry a large amount of information from BTS 200, backhaul link 106 is often an expensive, high-capacity connection. BTS 200 includes multiple routers 300 used to communicate information to backhaul link 106.

Routers 300 represent any hardware and/or software for communicating information. Routers 300 may include not only traditional routers but also switches, bridges, gateways, or any other suitable data communication device. At any given time, BTS 200 uses a particular router 300, designated as the active router 300, to communicate information to backhaul link 106, while the remaining routers 300 serve as backup routers 300.

Transport network 110 represents any collection of components, including hardware and/or software, for distributing information received from BTS 200, and for collecting information from a variety of network sources for communication to BTS 200. Transport network 110 may include any variety of hubs, routers, switches, gateways, or any other suitable components. In a particular embodiment, transport network 110 may include an aggregation node that collects data from a number of base transceiver sites 200 for communication to various destinations.

Transport network 110 may communicate information to a variety of destinations, including PSTN 112. Packets from transport network 110 may be converted to appropriate signals for PSTN 112 using media gateway 114. Transport network 110 may also communicate packets directly to other packet-based networks as illustrated by networks 116 in FIG. 1. Networks 116 and transport network 110 may use any suitable protocol or format for encoding information, including packets, cells, frames, segments, or other portions of information, generally referred to as "packets." Information communicated between transport network 110 and networks 116 may be converted to any suitable protocol or format by any suitable method to facilitate communication in system 100.

Figure 2:
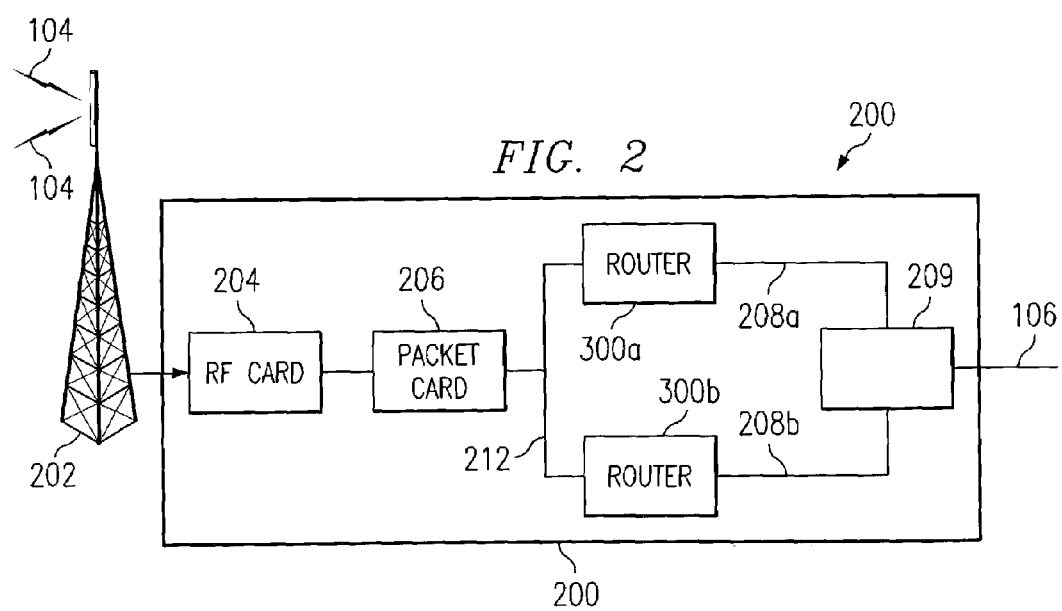
FIG. 2 is an illustration of the base transceiver site of FIG. 1.

FIG. 2 illustrates one embodiment of BTS 200, which includes an integrated or separate antenna 202, a radio frequency (RF) card 204, a packet card 206, and two routers 300a and 300b (generally referred to as routers 300). Each router 300 is coupled to backhaul link 106 by a connection 208 to coupler 209. Bus 212 provides communication among components of BTS 200.

Antenna 202 receives wireless signals 104 from wireless communication devices 102. Antenna 202 converts wireless signals 104 into signals suitable to be received by RF card 204. RF card 204 represents any hardware and/or software for converting signals received from antenna 202 into a form suitable for presentation to packet card 206. RF card 204 performs any suitable demodulation, protocol conversion, or other signal processing to present packets to packet card 206. For example, if antenna 202 receives wireless signals 104 encoded as CDMA signals, RF card 204 could convert signals into IP packets, carried over a suitable protocol such as a user datagram protocol (UDP). RF card 204 may communicate packetized information to packet card 206 using Ethernet, asynchronous transfer mode (ATM), or other suitable communication method.

Packet card 206 represents any suitable hardware and/or software for communicating packets between RF card 204 and routers 300. Packet card 206 communicates with other components of BTS 200 using bus 212. In a particular embodiment, packet card 206 is a packet line interface card. Packet card 206 may perform any suitable function related to routing, and in particular, packet card 206 may route packets to a particular router 300 that is designated as the active router 300.

Connections 208a and 208b (collectively called "connections 208") represent any real or virtual information pathway. For example, connection 208 may be a virtual channel, wireline connection, wireless connection, twisted pair, T1, T3, 10/100 Base T Ethernet, or any other suitable connection. Connections 208 are coupled to coupler 209. Coupler 209 represents any component for communicating information between connections 208 and backhaul link 106. In a particular embodiment, coupler 209 is a passive component that passes information received from either connection 208 directly to backhaul link 106. Coupler 209 also communicates information from backhaul link 106 to routers 300.

Bus 212 represents any backplane, trace, connection, or other suitable hardware and/or software that allows communication of information between components of BTS 200. Bus 212 may use any suitable method of communication, including Ethernet, ATM, IP, UDP, transport control protocol (TCP), or any other suitable method for communicating packetized information. In a particular embodiment, bus 212 communicates information in the form of user datagram protocol/Internet protocol (UDP/IP) packets carried over Ethernet.

In operation, BTS 200 exchanges information using antenna 202 and backhaul link 106. In a particular example, router 300a is initially the active router 300a, while router 300b is the inactive router. BTS 200 receives information from wireless devices 102 using antenna 202. RF card 204 and packet card 206 convert the information into a suitable form and communicate the information to active router 300a. Active router 300a communicates the information to connection 208a. Coupler 209 receives information from connection 208a and communicates the information to backhaul link 106.

Coupler 209 also receives information from backhaul link 106 and communicates the information to both routers 300. Active router 300a communicates the information to packet card 206. Inactive router 300b is disconnected from connection 208b, so that information communicated by coupler 209 to inactive router 300b is ignored. Packet card 206 and RF card 204 convert information received from active router 300a to a suitable form. BTS 200 then communicates the converted information to wireless devices 102 using antenna 202.

While exchanging information with wireless devices 102 and transport network 110, BTS 200 monitors the status of routers 300 to determine one or more performance parameters. A performance parameter provides a direct or indirect measurement of the relative effectiveness of routers 300 at communicating information. Although the following description uses a single performance parameter, it should be understood that router 300 may monitor any combination of performance parameters and may make determinations based on the performance parameters collectively, individually, or in any other suitable fashion.

BTS 200 may elect one of routers 300 as an active router 300 based on the performance parameter. For example, BTS 200 may periodically elect the router 300 with the highest performance parameter as active router 300. Alternatively, BTS 200 may elect a new active router 300b only when the currently active router 300a falls below a certain performance threshold as measured by its performance parameter. The ongoing selection of a particular router 300 as an active router 300 allows BTS 200 to maintain a consistent level of performance during partial or total failure of routers 300.

FIG. 3 shows a particular embodiment of router 300. Router 300 includes a network interface 302, a route processor 304, a transport network interface 308, and a memory 320. Additional components of router 300 include an accelerator card 316 and a thermometer 318 for detecting the operating temperature of router 300.

Network interface 302 represents any port or connection, whether real or virtual, that couples router 300 to bus 212. Network interface 302 allows router 300 to exchange information with packet card 206, as well as other routers 300. In particular, network interface 302 allows router 300 to exchange information relating to the relative effectiveness of routers 300, such as performance parameters, with other components of BTS 200.

Route processor 304 represents any hardware and/or software for processing information. Route processor 304 receives information from all components of router 300, and also controls components as necessary. Relay control 306 in route processor 304 represents any component, subprocess, hardware and/or software that allows route processor 304 to control operation of a relay 314 in router 300. Route processor 304 may include a microprocessor, micro-controller, digital signal processor (DSP), or any other suitable information-processing hardware and/or software.

Router 300 also includes a memory 320 for storage of information. Memory represents any volatile or non-volatile form of information storage, and may include optical media, magnetic media, removable media, local components, remote components, or any other suitable method of storing information. Memory 320 includes code 322 executed by route processor 304 to perform various tasks and control the overall operation and functions of router 300. Memory 320 also stores an election protocol 324 run by route processor 304, relay control code 326, and component status 328. The information in memory 320 allows router 300 to assess its performance, determine whether it should be elected the active router 300, and adjust its relay 314 to reflect its election as active router 300.

Election protocol 324 refers generally to any scheme or method for determining an active router and for providing a synchronized timing method for coordinating the activity of components of BTS 200. Election protocol 324 allows routers 300 to exchange information with other components of BTS 200 to allow election of an active router 300. Particular functions of election protocol 324 may be performed centrally by a particular component of BTS 200, distributed throughout various components of BTS 200, and/or coordinated in a peer-to-peer architecture. One example of a peer-to-peer protocol that may be used to elect an active router 300 is Hot Standby Routing Protocol (HSRP). HSRP is a shared protocol that monitors the information-carrying performance of several interfaces, determines the most effective interface, and routes information to that interface. HSRP may be modified to represent routers 300 in BTS 200 as interfaces, allowing the components of BTS 200 to maintain a common protocol for election of an active router 300.

Relay control code 326 represents particular instructions run by route processor 304 to control the operations of relay 314. In a particular embodiment, relay control code 326 positions relay 314 at a particular time in response to HSRP electing a new active router 300. Component status 328 stores information about various components of router 300. Component status 328 may be used by route processor 304 to determine one or more performance parameters for router 300, which may then be used by components of BTS 200 to determine which router 300 will be used as an active router 300.

Transport network interface 308 represents any hardware and/or software that allows router 300 to communicate information to transport network 110 using connection 208. In the depicted embodiment, interface 308 includes a digital portion 310 and a physical portion 312. Digital portion 310 receives packetized information from route processor 304 and performs any suitable operation to make information suitable for communication to backhaul link 106. For example, digital portion 310 may use a queuing process, a time division process, or any other suitable protocol, conversion, queuing or other suitable process to determine a particular sequence of packets. Physical portion 312 of transport network interface 308 represents the physical connection of router 300 to connection 208. Physical portion 312 establishes or breaks a physical connection to backhaul link 106 using a relay 314. Relay 314 represents any switch, circuit, electromechanical device, or other suitable component can establish or break a connection between router 300 and backhaul link 106. Relay 314 may have an opened position and a closed position. In the open position, information from digital component 310 of interface 308 is not communicated to connection 208. In the closed position, information from digital component 310 of interface 308 is communicated to connection 208.

Accelerator card 316 is a component of router 300 that performs various processing functions associated with routing packets. If accelerator card 316 is functioning poorly or not at all, router 300 becomes less capable of successfully processing incoming packets from network interface 302. As a result, the status of accelerator card 316 greatly affects the ability of router 300 to handle significant packet traffic in system 100. Therefore, maintaining a status on accelerator card 316 may be an important tool for gauging the operation of router 300. Similarly, thermometer 318 indicates an operating temperature for router 300. A sudden increase in the operating temperature or an indication that the operating temperature is above a certain threshold may indicate that the performance of router 300 has degraded or will likely degrade. As a result, the temperature indicated on thermometer 318 may be another useful indication of the functionality of router 300. In a particular embodiment, router 300 monitors accelerator card 316 and thermometer 318 to determine performance parameters for router 300.

Accelerator card 316 and thermometer 318 are examples of components that may be monitored to determine performance parameters, but router 300 may monitor additional or different components as well. Furthermore, router 300 may also maintain measures of overall function, such as rate of packet drops, checksum failures, packet congestion, latency in communication, out-of-order packet delivery, or any other suitable performance parameters. Any or all of these factors may contribute to the determination of one or more performance parameters for router 300. Multiple performance parameters may also be combined into a single performance parameter using any desired formula, algorithm, or other suitable combination of parameters.

In operation, system 100 receives wireless signals 104 from wireless communication devices and communicates them to transport network 110. BTS 200 receives wireless signals 104 at antenna 202. RF card 204 converts wireless signals 104 into packetized information and communicates the information to packet card 206, which routes the packets to the active routers 300. In one example, active router 300a has its relay 314a closed so that information received from network interface 302a is communicated to backhaul link 106 using connection 208a. Inactive router 300b has its relay 314b in the open position so that backhaul link 106 is not terminated on both routers at the same time.

As routers 300 continue in operation, the ability of routers 300 to function effectively may change relative to one another. For example, particular components may fail, or other conditions may arise that reduce functionality of router 300, such as elevated temperature. In a particular embodiment, route processor 304 periodically updates a performance parameter for the router 300 to reflect such changes. Routers 300 exchange their respective performance parameters with other components of BTS 200 in accordance with election protocol 324. Routers 300 then determine which router 300 should be the active router 300. The determination may be made according to a shared peer-to-peer election protocol 324, a central control device (such as packet card 206), or any other suitable architecture allowing consistent determination of an active router 300.

In a particular example, router 300a may begin as the active router 300a. During operation, routers 300 may determine based on election protocol 324 that router 300b would be superior to router 300a for routing information. Router 300b then switches its relay 314b from the open position to the closed position using relay control 306b. At the same time, router 300a switches its relay 314a from the closed position to the open position using relay control 306a. Packet card 206 subsequently routes packets to the new active router 300b. Election protocol 324 may provide a synchronized timing system so that routers 300 may switch relays simultaneously so that the flow of information between BTS 200 and transport network 110 continues without interruption. Alternatively, another component of BTS 200 may synchronize the switchover by directly controlling routers 300.

The determination of which router 300 is active at a particular time may be made on any suitable basis. In one example, the active router 300 stays active unless it stops sending keep-alive packets. In an alternative embodiment, the designation of one of the routers 300 as active is made periodically based on which router 300 has the highest performance parameter at a particular time. In variations of this embodiment, election protocol 324 may make the determination based on a performance parameter averaged over a particular amount of time. In yet another embodiment, a new router 300 will be selected as active only when a performance parameter for the active router 300 falls below a predetermined threshold.

There are numerous ways for determining a performance parameter of routers 300 as well. For example, in HSRP, the performance parameter of a router 300 may be modeled as the health score of an interface, which is a calculated quantity derived from several performance measures. HSRP performs automatic switching between interfaces based on the failure or reduction in capacity of a particular interface. By modeling routers 300 as interfaces, BTS 200 can exploit the ability of HSRP to select the most appropriate interface in order to elect an active router 300. A modification in HSRP allows HSRP to control relays using relay control code 326, so that relays 314 are automatically switched at the same time according to the rules of HSRP.

FIG. 4 is a flow chart 400 that illustrates a sample method for maintaining the status of, for example, router 300a, and for selecting a new active router 300. Router 300a monitors its own operation at step 402. Router 300a uses the information to determine a performance parameter for itself at step 404. Performance parameters may include component status, temperature, rate of dropped packets, packet latency, checksum failure, any other suitable measurement of the ability of router 300a to handle packets, or any combination of the described performance parameters. At step 406, router 300a communicates the performance parameter to other components of BTS 200. Updates of the performance parameter may be performed asynchronously, serially, in parallel, or with any other suitable frequency. In a particular embodiment, router 300a periodically communicates keep-alive signals, which indicate that router 300a is still functioning and provide the performance parameter for use by other components. Router 300a monitors for similar information from router 300b at step 408.

At step 410, router 300a determines whether a performance parameter has been received from router 300b within a predetermined time interval. If a performance parameter is not received from router 300b, router 300a then determines whether it is currently designated as active at step 412. If router 300a is active, router 300a continues to operate from step 402.

If router 300a is not active, router 300a switches relay 314a to the active position at step 414. Router 300a also notifies BTS 200 components about the switch at step 416. This allows components such as packet card 206 to send packets to the new active router 300a. Router 300a then may continue to monitor its performance at step 402 in case router 300b comes back on line.

If a performance parameter is received from router 300b, then at step 418, router 300a determines if the router 300b has a higher performance parameter than router 300a. If router 300a has a higher performance parameter, router 300a determines if it is currently active at step 420. If router 300a is active and router 300b does not have a higher performance parameter, then router 300a continues to operate from step 402. On the other hand, if router 300a has a higher health score and is not currently active, then router 300a switches relay 314a to the active position at step 426. Router 300a may then optionally notify other network components about the switch at step 416. Such a step is not necessary when components of BTS 200 operate according to a common scheme, such as election protocol 324, which automatically implements and synchronizes actions such as switching relays, redirecting packets to new routers, and other suitable tasks associated with selecting a new active router 300. However, even in a common system, the message may be useful for confirming that relay 314a was actually switched, providing notification in case of relay 314a failure, or providing any other suitable information relating to the election of a new active router 300b.

If router 300*b* has a higher performance parameter, then router 300*a* may switch its relay 314*a* based on a logic shown in step 420. If router 300*a* is not currently active, router 300*a* stays inactive and continues to monitor component status at step 402. If, on the other hand, router 300*a* is active and has a lower score, router 300*a* switches relay 314*a* to the inactive position using relay control 306. Router 300*a* may then broadcast a message to a network indicating that it is no longer active at step 416.

The method shown in FIG. 4 is only one example of a possible method for updating component status and switching between an active and a backup router dynamically. In an alternative embodiment, the determination on whether to designate a new router 300 as active may be made based on more complicated algorithms than which router 300 has the higher performance parameter. For example, router 300*b* could become active if the performance parameter of router 300*a* was lower by a certain amount or for a certain time interval. Furthermore, the method may also be controlled centrally by a component of BTS 200 or in a peer-to-peer fashion. Similarly, different protocols, synchronization methods, communication techniques, and communication formats may be used in the method, and particular steps may be performed by different or other components sequentially, concurrently, continuously, or in any other suitable manner.

Particular embodiments have been described in detail, but numerous other embodiments will be apparent to one skilled in the art. BTS 200 is only one example of a telecommunication device using routers 300, but the described techniques may be applied to any device in which router redundancy might be useful. The described techniques may also be implemented with different or additional components and in a variety of architectures, including peer-to-peer, distributed and centralized architectures. Furthermore, the techniques are adaptable to a wide variety of communication technology, including telephony, IP networks, Ethernet, and numerous other methods of communicating information.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for selecting an active router in a telecommunication device, comprising:
   providing a plurality of routers in the telecommunication device, each router comprising a relay having a first position and a second position;
   coupling each of the relays of the routers to a single physical link;
   monitoring a status for each of the routers; and
   electing one of the routers as an active router by positioning its corresponding relay, wherein the step of electing comprises:
   determining a performance parameter for each router;
   electing the active router based on the performance parameters according to an election protocol;
   positioning the relays of the routers based on the election, wherein positioning the relays comprises:
   determining a particular time for positioning the relays using the election protocol; and
   positioning the relays at the particular time, wherein:
   each router is represented as an interface in hot standby routing protocol (HSRP);
   the performance parameter for each router comprises an interface health score;
   the HSRP makes a determination of the active routers based on the health scores; and
   the HSRP automatically updates network components on the selection of the active router.

2. The method of claim 1, wherein the telecommunication device comprises a base transceiver site.

3. The method of claim 2, wherein the single physical link comprises a backhaul link.

4. The method of claim 3, wherein the backhaul link comprises a T1 connection.

5. The method of claim 1, wherein monitoring a status comprises exchanging keep-alive signals among the routers.

6. The method of claim 5, wherein:
   the keep-alive signals comprise a performance parameter for each router; and
   the active router is selected based on the performance parameters.

7. The method of claim 1, wherein the method further comprises:
   determining that the performance of an active router has degraded; and
   selecting another router to be a new active router.

8. A telecommunication device, comprising:
   a plurality of routers, each router operable to determine a performance parameter for that router;
   a bus operable to communicate the performance parameters between the routers;
   a physical link;
   for each router, a relay operable to couple the router to the physical link, each relay having a first position and a second position, each router operable to position the relay based on the performance parameters received from the other routers; and
   an election protocol running on the route processor, operable to:
   determine based on the signal whether the relay needs to be repositioned; and
   reposition the relay at a particular time such that the relay is repositioned in synchronization with a corresponding relay in the other router, wherein:
   each router is represented as an interface in hot standby routing protocol (HSRP);
   the performance parameter for each router comprises an interface health score;
   the HSRP makes a determination of the active routers based on the health scores; and
   the HSRP automatically updates network components on the selection of the active router.

9. The device of claim 8, wherein the device comprises a base transceiver site.

10. The device of claim 8, wherein the physical link comprises:
    a backhaul link;
    a connection coupled to each router; and
    a coupler coupled to the backhaul link and the connections, the coupler operable to:
    receive a first signal from the backhaul link;
    communicate the first signal to the connections;
    receive a second signal from at least one connection; and
    communicate the second signal to the backhaul link.

11. The device of claim 10, wherein the backhaul link is a T1 connection.

12. The device of claim 8, further comprising an election protocol running on the routers, wherein:

the election protocol is operable to elect an active router based on the performance parameters; and the routers are operable to position their respective relays based on the election of the active router by the election protocol.

13. The device of claim 12, wherein the election protocol is further operable to synchronize the positioning of the relays.

14. A system for providing router redundancy, comprising:

a single physical link;

a plurality of routers coupled to the single physical link, each router comprising a relay, each relay having a connected position connecting the router to the single physical link and a disconnected position operable to interrupt the connection between the router and the single physical link;

means for coupling each of the relays to a single physical link;

means for monitoring a status for each of the routers; and means for electing one of the routers as an active router by positioning its corresponding relay, wherein:

each router is represented as an interface in hot standby routing protocol (HSRP);

the performance parameter for each router comprises an interface health score;

the HSRP makes a determination of the active routers based on the health scores; and the HSRP automatically updates network components on the selection of the active router.

15. A method for selecting an active router in a telecommunication device, comprising:

providing a plurality of routers coupled to a single physical link, each router comprising a relay having a connected position allowing information to be communicated to the physical link and a disconnected position interrupting communication of information to the physical link;

determining a performance parameter for each router;

determining one of the routers as an active router based on the performance parameters;

positioning the relay of the active router in the connected position;

positioning the relays of all of the other routers in the disconnected position, wherein:

each router is represented as an interface in hot standby routing protocol (HSRP);

the performance parameter for each router comprises an interface health score;

the HSRP makes a determination of the active routers based on the health scores; and the HSRP automatically updates network components on the selection of the active router.

16. The method of claim 15, wherein:

the health score is based on a status received from a plurality of components of each router; and the health score is communicated as an HSRP keep-alive signal.

17. The method of claim 16, wherein the plurality of components comprises:

an accelerator card; and a thermometer.

18. A router, comprising:

a network interface operable to receive a signal from at least one other router;

a relay operable to couple to a physical link, the relay having a first position and a second position;

a route processor operable to position the relay based on the signal; and an election protocol running on the route processor, operable to:

determine based on the signal whether the relay needs to be repositioned; and reposition the relay at a particular time such that the relay is repositioned in synchronization with a corresponding relay in the other routers wherein:

each router is represented as an interface in hot standby routing protocol (HSRP);

the performance parameter for each router comprises an interface health score;

the HSRP makes a determination of the active routers based on the health scores; and the HSRP automatically updates network components on the selection of the active router.

19. The router of claim 18, wherein:

the signal comprises a first performance parameter for the other router;

the route processor is further operable to determine a second performance parameter for the router; and the route processor positions the relay in the first position if the first performance parameter is higher than the second performance parameter and in the second position if the second performance parameter is higher than the first performance parameter.

* * * * *